(12) United States Patent
Macbeth et al.

(10) Patent No.: US 6,577,484 B1
(45) Date of Patent: Jun. 10, 2003

(54) ARC FAULT DETECTOR DEVICE UTILIZING THE DI/DT AND 60 HZ COMPONENTS OF AN ARCING WAVEFORM

(75) Inventors: Bruce F. Macbeth, Syracuse, NY (US); Jeffrey C. Richards, Baldwinsville, NY (US); Phillip M. Stanley, Jordan, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 62 days.

(21) Appl. No.: 09/735,139

(22) Filed: Dec. 12, 2000

(51) Int. Cl.[7] .................................................. H02H 3/24
(52) U.S. Cl. ........................................................ 361/92
(58) Field of Search ............................... 361/92, 42, 83, 361/93.1, 96, 97, 111

(56) References Cited

U.S. PATENT DOCUMENTS

| | | | | |
|---|---|---|---|---|
| 5,208,542 A | * | 5/1993 | Tennies et al. ............. | 324/544 |
| 5,359,293 A | * | 10/1994 | Boksiner et al. ............ | 324/544 |
| 5,584,974 A | * | 12/1996 | Sellers .................. | 204/192.13 |
| 5,726,577 A | * | 3/1998 | Engel et al. ................ | 324/536 |
| 5,818,237 A | * | 10/1998 | Zuercher et al. ............ | 324/536 |
| 5,963,406 A | * | 10/1999 | Neiger et al. ................. | 361/42 |
| 6,031,699 A |   | 2/2000 | Dollar, II et al. | |
| 6,246,556 B1 | * | 5/2001 | Haun et al. .................... | 361/42 |

OTHER PUBLICATIONS

Exar Corporation, XR–555 Timing Circuit, XR–556 Timing Circuit; 1987 Data Sheets, pp. 5–121—5–123, 5–128—5–130.*

* cited by examiner

Primary Examiner—Brian Sircus
Assistant Examiner—Z Kitov
(74) Attorney, Agent, or Firm—Wall Marjama & Bilinski LLP

(57) ABSTRACT

An arc fault detector for detecting arcing faults in an electrical distribution/branch circuit includes both a di/dt detector/amplifier and a 60 Hz (threshold) detector/amplifier connected to a current sensor. The detector includes a circuit which masks inductive/tungsten in-rush current such as is generated by a dimmer switch. The current sensor is a toroidal current transformer, with either two LINE conductors or a LINE and a NEUTRAL conductor passing through the toroid. A multi-winding secondary is formed around the toroidal core whose terminations constitute the output of the current sensor. When the outputs of both detectors simultaneously indicate fault current which is not due to a dimmer switch, a breaker coil is energized which in turn de-energizes the electrical distribution/branch circuit.

37 Claims, 10 Drawing Sheets

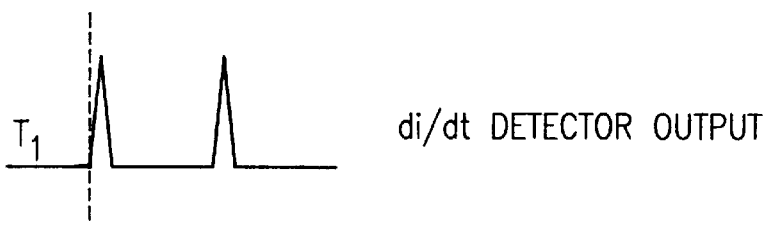
FIG.3A  di/dt DETECTOR OUTPUT
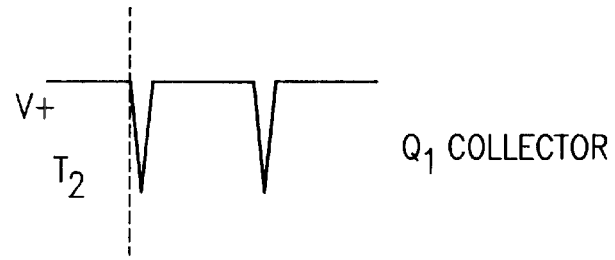
FIG.3B  Q₁ COLLECTOR
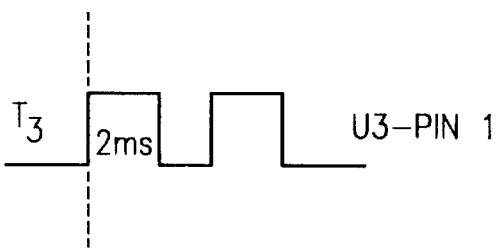
FIG.3C  U3-PIN 1
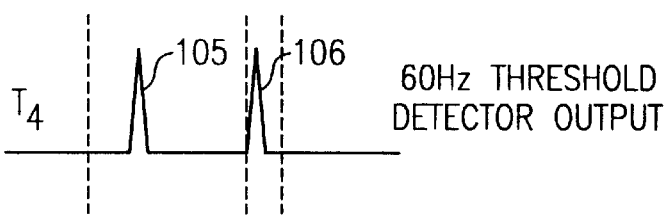
FIG.3D  60Hz THRESHOLD DETECTOR OUTPUT
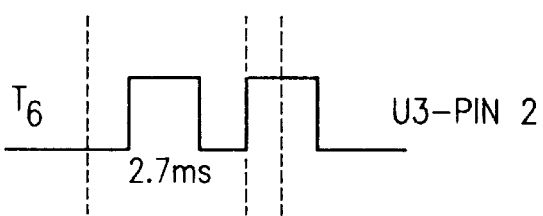
FIG.3E  U3-PIN 2
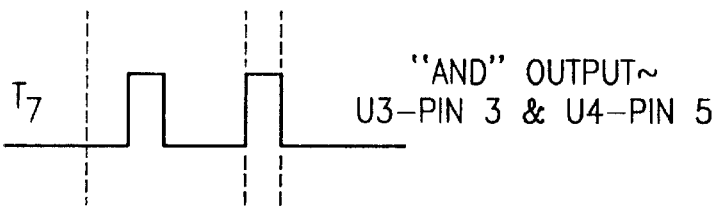
FIG.3F  "AND" OUTPUT~ U3-PIN 3 & U4-PIN 5

ARC FAULT DETECTOR DEVICE UTILIZING THE DI/DT AND 60 HZ COMPONENTS OF AN ARCING WAVEFORM

FIELD OF THE INVENTION

This invention relates to an arc fault detection device, and in particular, to an arc fault detection device that uses two components of an arcing waveform.

BACKGROUND OF THE INVENTION

A percentage of fires each year are caused by electrical branch circuit wiring arcing faults involving currents below the trip level of a conventional circuit breaker or OCPD (over current protection device) as well as below the handling rate of the breaker. Basic over current protection afforded by circuit breakers is designed to prevent $I^2R$ heating of the wiring in the electrical distribution system, caused by circuit overloading or line-to-line faults, and not necessarily arcing faults. A true short circuit is a rarity in an electrical system. In fact, it is more accurate to think of electrical faults as having some level of impedance, such as a high impedance arc fault (low current) or a low impedance fault (high current). Many electrical faults begin as high impedance breakdowns between the line and neutral conductors or to the ground wire or device components. AFCI (Arc Fault Circuit Interruption) technology affords protection from conditions that may not necessarily be an immediate threat but could become hazardous if left unattended.

In order to start a fire, three elements must be present fuel, oxygen(air), and energy to ignite the fuel. Arcing is defined as a luminous discharge of electricity across an insulating medium. The electrical discharge of an arc can reach temperatures of several thousand degrees Celsius. Arcing produces sufficient energy to reach the ignition point of nearby combustible material(s) before a circuit breaker can respond. Arc detection is an enhancement to thermal magnetic overload detection typically used in circuit breakers or OCPD's, which alone may not detect and respond to arc faults.

A number of devices for detecting arc faults and methods of detection have been used in the past. These include using E and B field arc sensors, detecting the amplitude of the rate of change of current signals when an arc fault occurs, using non-overlapping band pass filters to detect white noise characteristic of arcs, and utilizing the high frequency components (RF) of arcing waveforms to detect arcing faults. While some of these techniques are more or less effective than others, they require relatively sophisticated arc sensors and circuits. Heretofore, most arc detection circuits have been incorporated in circuit breakers.

There is a need for simple economical arc fault detectors that can be included in wiring devices such as duplex receptacles, multi-outlet strips, or in-line devices, and that offer the same downstream protection as an arc fault detector incorporated in a circuit breaker but at lower cost. There is a need for an arc fault circuit detector in wiring devices that can be provided at a reduced cost compared with arc fault circuit detecting circuit breakers comparable to the reduction in cost between ground fault interrupting receptacles and ground fault interrupting circuit breakers.

SUMMARY OF THE INVENTION

Arc fault detection technology responds to arcing faults by looking at specific arc "signature" characteristics unique to arcing faults. This invention provides an arc fault circuit interrupter, preferably contained in a receptacle embodiment, that detects parallel or line to line (LINE to NEUTRAL or LINE to GROUND) arcs, producing currents of 75 amps or greater. The detection of parallel arcs is a requirement in Underwriters Laboratories Standard 1699 for duplex receptacle AFCI's known as combination devices. The requirements of UL-1699 state that an arc fault protection device must detect an arc within eight arcing half cycles at 75 Amperes or greater.

Briefly stated, an arc fault detector for detecting arcing faults in an electrical distribution/branch circuit includes both a di/dt detector/amplifier and a 60 Hz (threshold) detector/amplifier connected to a current sensor. The detector includes a circuit which masks inductive/tungsten in-rush current such as is generated by a dimmer switch. The current sensor is a toroidal current transformer, with either two LINE conductors or a LINE and a NEUTRAL conductor passing through the toroid. A multi-winding secondary is formed around the toroidal core whose terminations constitute the output of the current sensor. When the outputs of both detectors simultaneously produce signal, a circumstance that is produced by a phase control dimmer, a breaker coil is energized which in turn de-energizes the electrical distribution/branch circuit to terminate the parallel arc fault.

According to an embodiment of the invention, an arc fault detector for an AC power line, where the AC power line includes first and second conductors for carrying current to a load, includes a current sensor coupled to the first and second conductors for generating a signal responsive to rate of change and threshold behavior of the current in the conductors; first and second detectors receiving the signal from the current sensor as inputs; the first detector detecting the rate of change behavior of the current and outputting a first pulse; the second detector detecting the threshold characteristics of the current and outputting a second pulse; first and second pulse wideners for widening the first and second pulses, respectively; a dimmer delay circuit receiving the first pulse as input and outputting a pulse having a predetermined delay and pulse width; a first logic circuit receiving the widened first and second pulses and producing a pulse output indicative of both widened first and second pulses being present at the first logic circuit simultaneously, and a second logic circuit receiving the output from the first logic circuit and the pulse from the dimmer delay circuit and producing a pulse output indicative of both the pulse output from the first logic circuit and the pulse from the dimmer delay circuit being present at the second logic circuit simultaneously.

According to an embodiment of the invention, an arc fault detector for an AC power line where the AC power line includes first and second conductors for carrying current to a load includes a current sensor coupled to the first conductors for generating a signal responsive to rate of change behavior of the current in the conductor; a resistive element in series with the second conductor; a first detector receiving the signal from the current sensor as input; a second detectors receiving a signal from a load side of the resistive element as input; the first detector detecting the rate of change behavior of the current and outputting a first pulse; the second detector detecting a threshold characteristic of the current and outputting a second pulse; first and second pulse wideners for widening the first and second pulses, respectively; a dimmer delay circuit receiving the first pulse as input and outputting a pulse having a predetermined delay and pulse width; a first logic circuit receiving the widened first and second pulses and producing a pulse output indicative of both widened first and second pulses being present at the first logic circuit simultaneously, and a second logic circuit receiving the output from the first logic circuit and the pulse from the dimmer delay circuit and producing a pulse output indicative of both the pulse output from the first logic circuit and the pulse from the dimmer delay circuit being present at the second logic circuit simultaneously.

According to an embodiment of the invention, an arc fault detector for an AC power line, where the AC power line includes first and second conductors for carrying current to a load, includes means, coupled to the first and second conductors, for generating a signal responsive to rate of change and threshold behavior of the current in the conductors; means for detecting the rate of change behavior of the current and outputting a first pulse; means for detecting the threshold characteristics of the current and outputting a second pulse; means for widening the first and second pulses, respectively; delay means for receiving the first pulse as input and outputting a pulse having a predetermined delay and pulse width; first logic means for receiving the widened first and second pulses and producing a pulse output indicative of both widened first and second pulses being present at the first logic means simultaneously; and second logic means for receiving the output from the first logic means and the pulse from the delay means and producing a pulse output indicative of both the pulse output from the first logic means and the pulse from the delay means being present at the second logic means simultaneously.

According to an embodiment of the invention, a method for detecting an arc fault in an AC power line, where the AC power line includes first and second conductors for carrying current to a load, includes the steps of: (a) generating a signal responsive to rate of change and threshold behavior of the current in the conductors; (b) detecting the rate of change behavior of the current and outputting a first pulse; (c) detecting the threshold characteristics of the current and outputting a second pulse; (d) creating a third pulse similar to the first pulse but having a predetermined delay and pulse width; (e) producing a fourth pulse indicative of both the first and second pulses being present at a first logic point simultaneously; and (f) producing a fifth pulse indicative of both the third and fourth pulses being present at a second logic point simultaneously.

According to an embodiment of the invention, a method for detecting an arc fault in an AC electrical distribution system includes the steps of detecting a sharply rising edge in current flowing through a portion of the AC electrical distribution system, detecting an increase in magnitude of the current above a predetermined threshold level, and establishing that the sharply rising edge in the current and the increase in magnitude of the current are not caused by an inrush current from a device.

According to an embodiment of the invention, a method for detecting an arc fault in an electrical distribution system includes the steps of monitoring a load current and a time derivative of the current carried by the electrical distribution system; creating first and second signals from the step of monitoring; independently comparing magnitudes of the first and second signals against pre-established thresholds; creating first and second asynchronous pulses from the step of comparing magnitudes; elongating the first and second asynchronous pulses by first and second pre-determined durations; opening electrical contacts in the electrical distribution system if the elongated pulses overlap; and interrupting a flow of electrical current through the electrical distribution system upon an overlapping occurrence.

According to an embodiment of the invention, a method for detecting an arc fault in an electrical distribution system, wherein the electrical distribution system includes a plurality of conductors, includes the steps of monitoring a load current and a time derivative of current carried by the conductors; creating first and second signals from the step of monitoring; independently comparing magnitudes of the first and second signals against preestablished thresholds; creating first and second asynchronous pulses from the step of comparing magnitudes; initiating a pre-determined time interval when the first signal first exceeds the threshold; elongating the first and second asynchronous pulses by first and second pre-determined durations; and opening electrical contacts in the electrical distribution system if the elongated pulses overlap and only after the pre-determined time interval has elapsed.

According to an embodiment of the invention, a method for detecting an arc fault in an electrical distribution system, wherein the electrical distribution system includes a plurality of conductors, includes the steps of discriminating between arcing faults and phase control dimmer signals; producing a pulse elongated by a pre-determined time whenever a magnitude of a time first derivative of a current carried on the electrical conductors exceeds a threshold; initiating a predetermined time interval when the pulse is detected; generating a trigger signal that triggers a set of load current contacts to open when the pulse is detected; disabling the trigger signal when the current is below a threshold; and disabling the trigger signal if the pulse occurs during the pre-determined time interval.

BRIEF DESCRIPTION OF THE DRAWINGS

FIG. 3A shows a circuit waveform used in explaining the embodiment of FIG. 1.

FIG. 3B shows a circuit waveform used in explaining the embodiment of FIG. 1.

FIG. 3C shows a circuit waveform used in explaining the embodiment of FIG. 1.

FIG. 3D shows a circuit waveform used in explaining the embodiment of FIG. 1.

FIG. 3E shows a circuit waveform used in explaining the embodiment of FIG. 1.

FIG. 3F shows a circuit waveform used in explaining the embodiment of FIG. 1.

DETAILED DESCRIPTION OF THE PREFERRED EMBODIMENT

Figure 1:
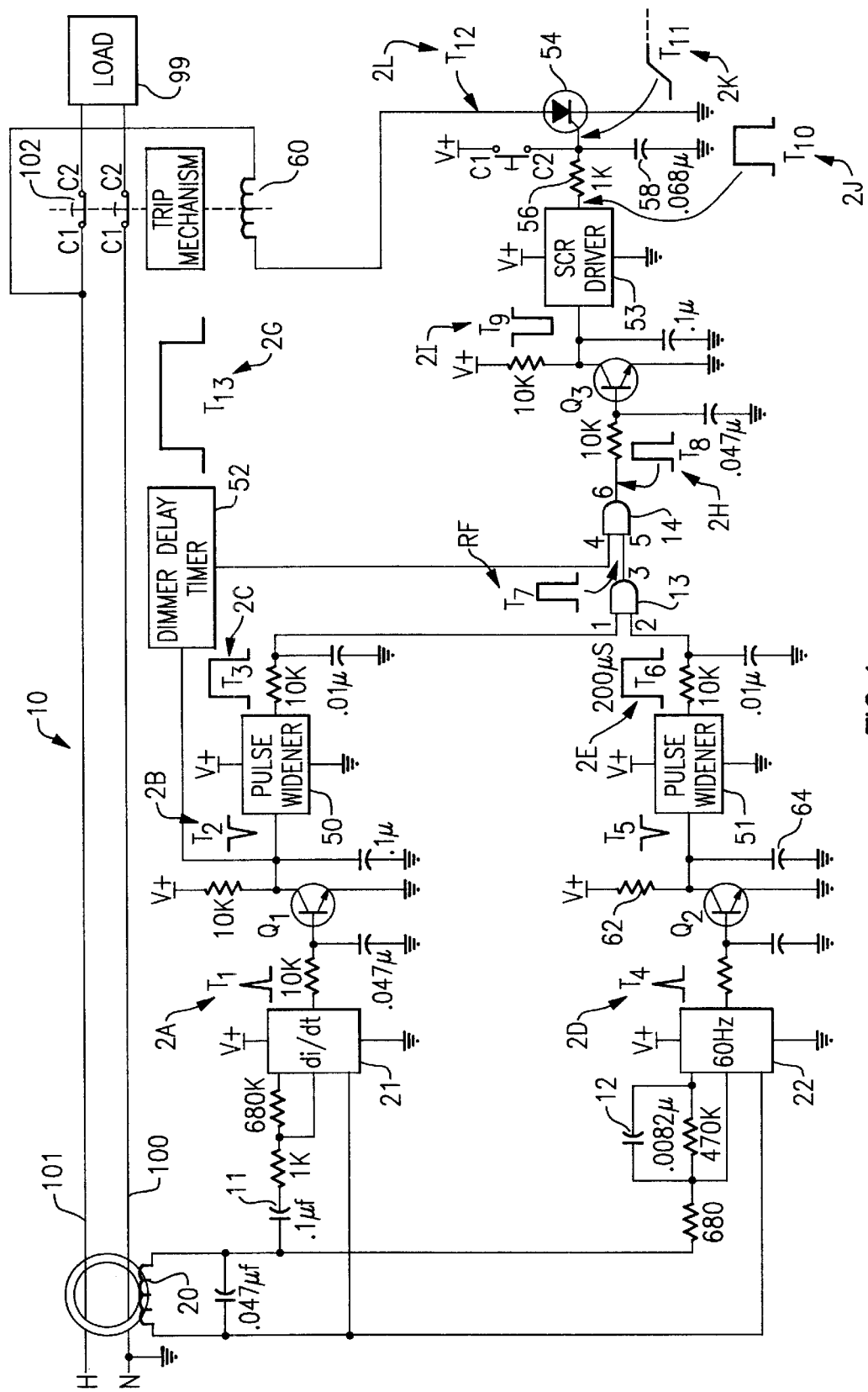
FIG. 1 shows a schematic diagram of a fault detector according to an embodiment of the present invention.

Referring to FIG. 1, an arc fault circuit interrupter (AFCI) 10 is illustrated in schematic form. AFCI 10 is formed from components that are readily available and that can be easily integrated into an electrical receptacle, plug, or in-line device. The circuit is designed so that it can be manufactured in the same form as ground fault circuit interrupter (GFCI) receptacle devices. AFCI 10 protects an electrical circuit which includes at least a neutral conductor 100 and a line conductor 101 connected to a power source (not shown). A ground conductor (not shown) is optionally present. AFCI 10 detects arcs occurring between line conductor 101 and ground, neutral conductor 100 and ground should the power source be of reverse polarity, or line conductor 101 and neutral conductor 100.

A circuit interrupter 102 is connected in series with line conductor 101 between the power source and a load 99. This embodiment incorporates a first stage arc sensor 20, shown as a current transformer, which is configured to respond to the rate of change of current with respect to time. Sensor 20 may be designed with a physically small core of a type and number of secondary turns which gives optimum sensitivity during arcing. Either a single conductor (LINE) or both conductors can pass thru the sensor. The arc fault detector detects arcs that are either LINE to GROUND or LINE to NEUTRAL. Sensor 20 feeds two detector/amplifiers 21, 22. Detector/amplifiers 21, 21 are preferably RV4141A (Fairchild Semiconductor) low power ground fault interrupter ICs. Detector/amplifier 21, also referred to as the di/dt stage, has a high pass filter capacitor 11 on its input side, while detector/amplifier 22, also referred to as the 60 Hz or "threshold" stage, uses a low pass filter capacitor 12 in a feedback stage. Preferable connections for detector/amplifiers on both input and output sides are shown in more detail in FIGS. 3 and 4, respectively. The 60 Hz threshold detector 22 controls the level of detection, i.e., 75 Amperes or greater load current.

Figure 2A:
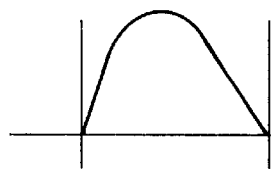
FIG. 2A shows the current versus time waveform of a normal half cycle.
Figure 2B:
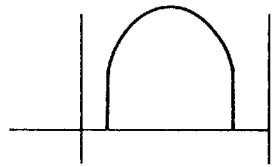
FIG. 2B shows the current versus time waveform for a "smoothie" arc fault.
Figure 2C:
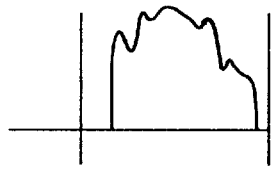
FIG. 2C shows the current versus time waveform for a sputtering arc fault.
Figure 2D:
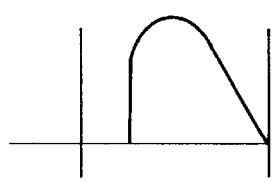
FIG. 2D shows the current versus time waveform for a dimmer switch.

Referring to FIG. 2A, a waveform showing the current versus time for a normal half cycle of AC power is shown. This is the traditional sine wave shape. An arc fault detector must distinguish this shape from other waveforms indicative of arc faults. FIG. 2B shows a "smoothie" arc fault characterized by a sharp rise and fall in the current, i.e., by a di/dt edge when the arc starts and when the arc stops. The instantaneous arc current follows smoothly the threshold portion of the FIG. 2A waveform. FIG. 2C shows a sputtering arc fault characterized by large di/dt edges on both ends of the half cycle, along with a series of smaller di/dt edges during the threshold portion of the waveform in FIG. 2A. FIG. 2D shows the current from a dimmer switch which also contains a di/dt edge. If a di/dt edge detector does not distinguish an arcing waveform from a dimmer switch, false alerts occur.

Figure 6:
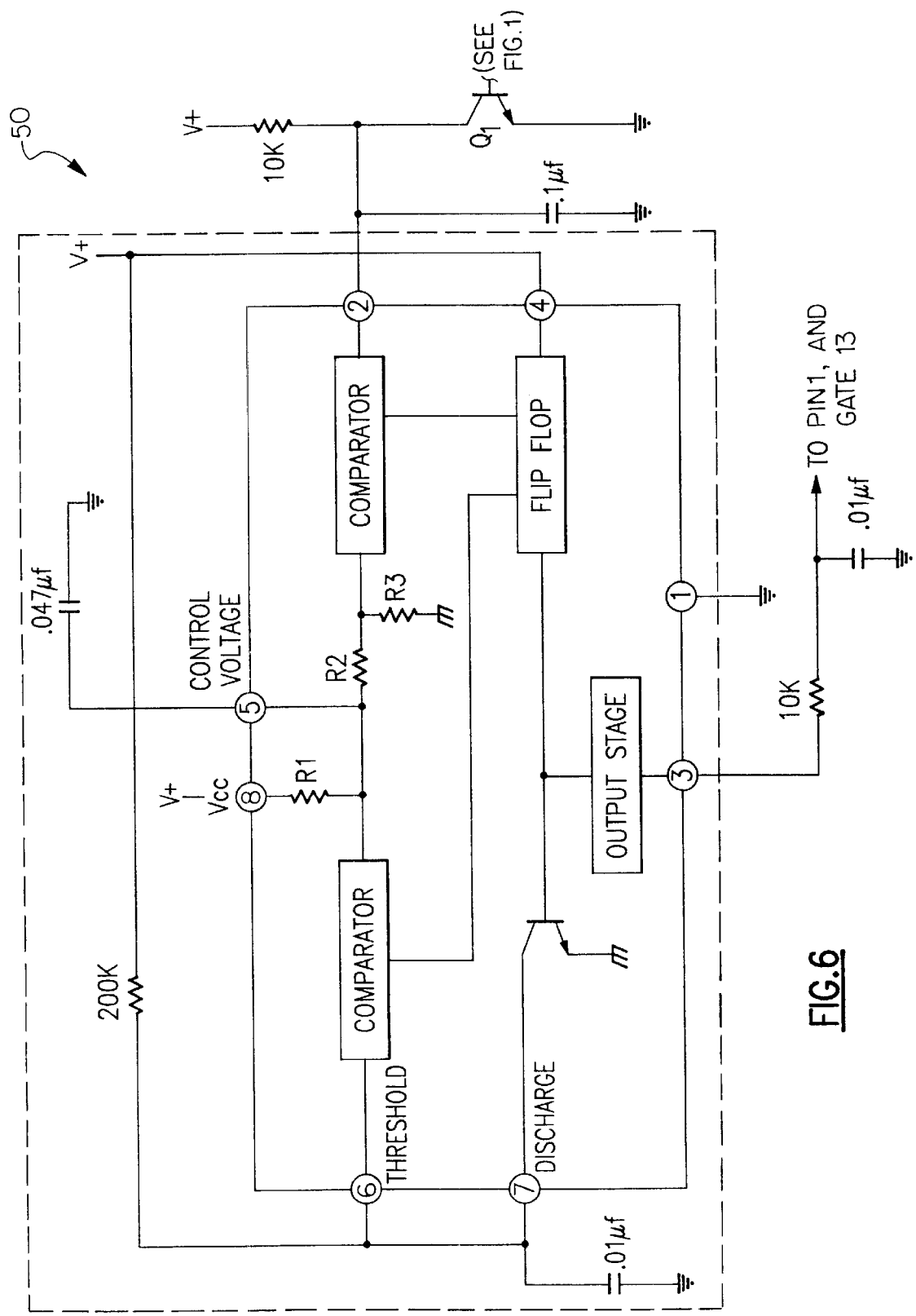
FIG. 6 shows a schematic diagram of an embodiment of a pulse widener circuit used in conjunction with the di/dt detector used in the embodiment of FIG. 1.
Figure 7:
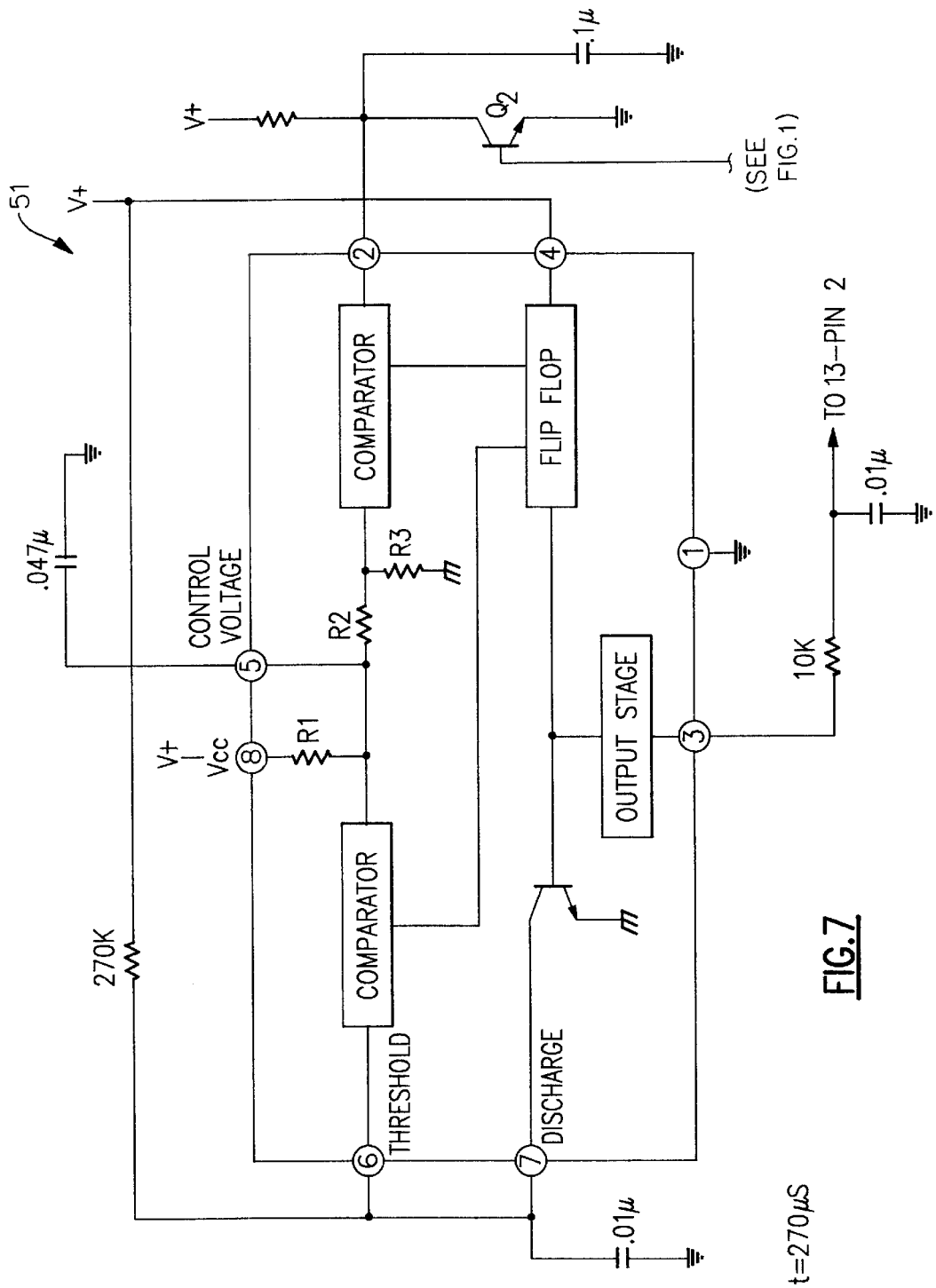
FIG. 7 shows a schematic diagram of an embodiment of a pulse widener circuit used in conjunction with the 60 Hz detector used in the embodiment of FIG. 1.

Referring to FIGS. 3A and 3D, the waveforms at the outputs of detector amplifiers 21, 22 are shown at T1 and T4 respectively. The detected arcing and threshold signals are characteristically narrow pulses. Pulse wideners 50, 51 increase the pulse width of the signals for processing to a approximately 1–3milliseconds. The outputs of pulse wideners 50, 51 are shown in FIGS. 3C and 3E at T3 and T6 respectively. Pulse wideners 50, 51 are preferably 555 timers, and are shown in detail in FIGS. 6 and 7 respectively. Pulse wideners 50, 51 perform two functions. First, they widen the pulses so they are suitable for digital logic processing. Second, comparing FIGS. 3A and 3D, the pulse from the di/dt detector 21 occurs before the pulse from the 60 Hz threshold detector 22. Widening the pulse from the di/dt detector 21 is thus necessary to ensure that the pulses from each stage reach AND gate 13 with enough overlap to detect arcing reliably. Unlike some prior art detectors, the detector of the present invention does not require a di/dt edge occurring simultaneously with the threshold maximum which is a characteristic of the sputtering arc fault shown in FIG. 2C and not a characteristic of the smoothie arc fault shown in FIG. 2B.

Figure 3G:
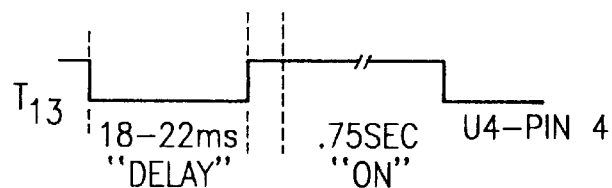
FIG. 3G shows a circuit waveform used in explaining the embodiment of FIG. 1.
Figure 4:
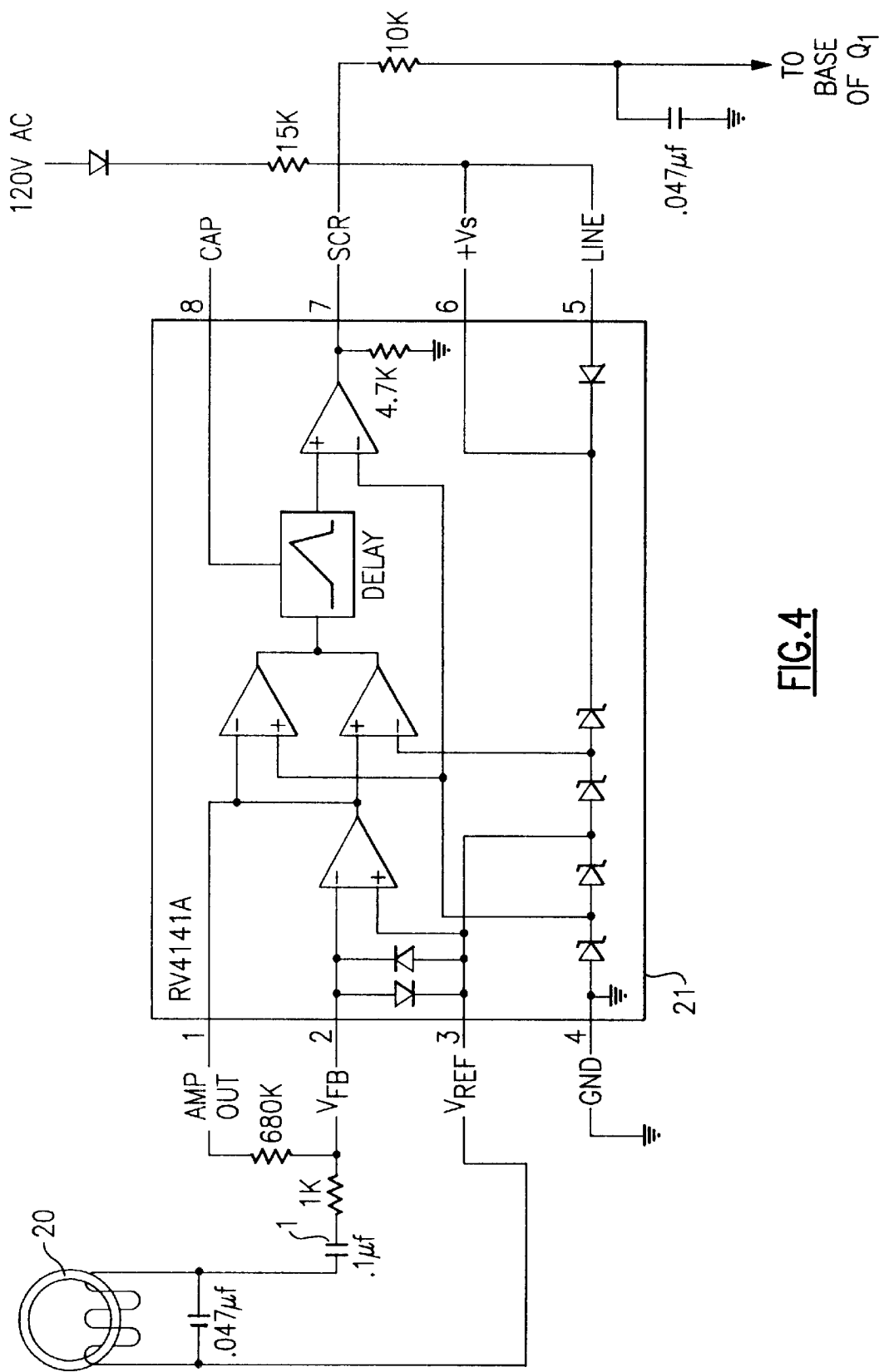
FIG. 4 shows a schematic diagram of an embodiment of the di/dt detector used in the embodiment of FIG. 1.
Figure 5:
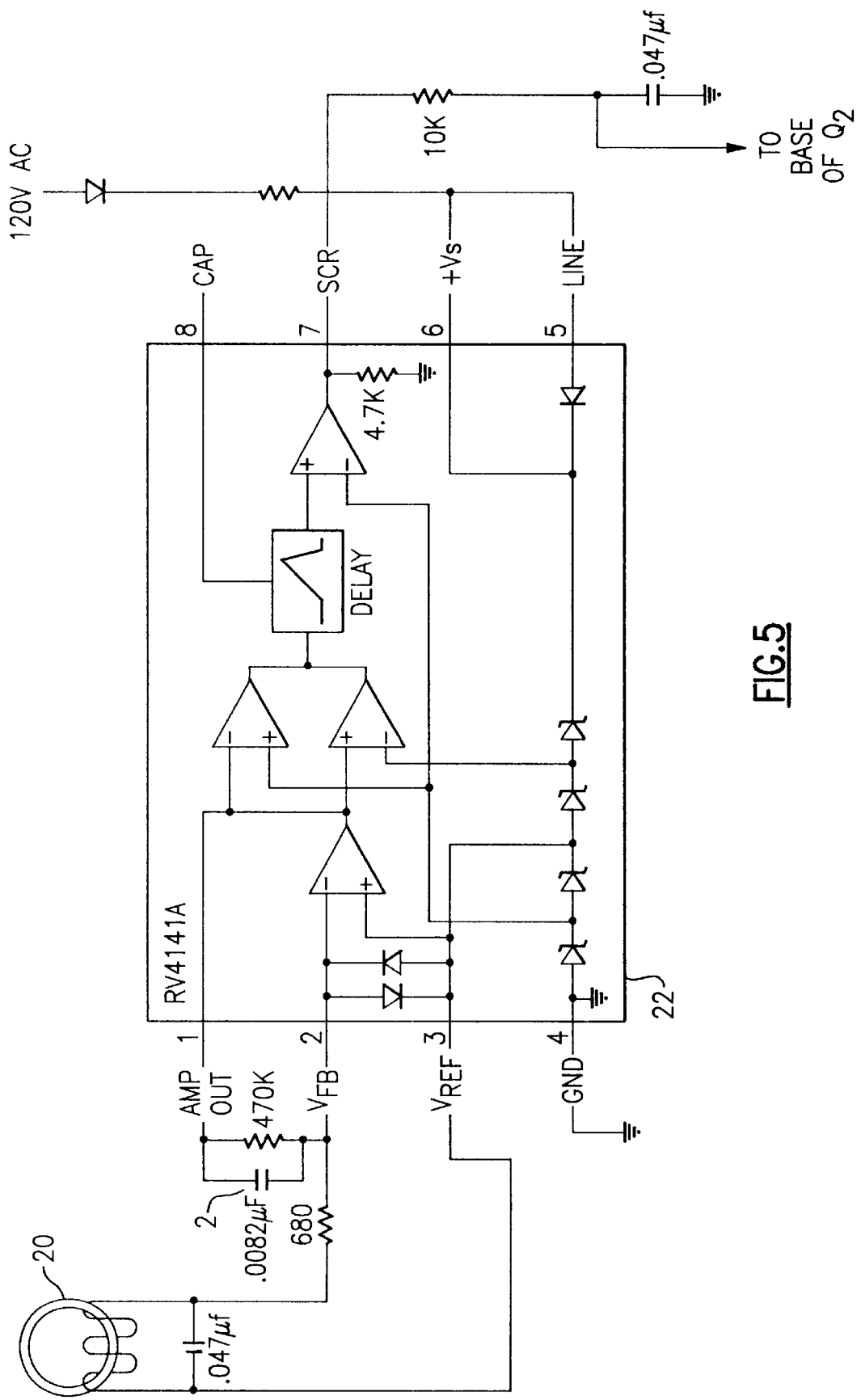
FIG. 5 shows a schematic diagram of a 60 Hz detector used in the embodiment of FIG. 1.
Figure 8:
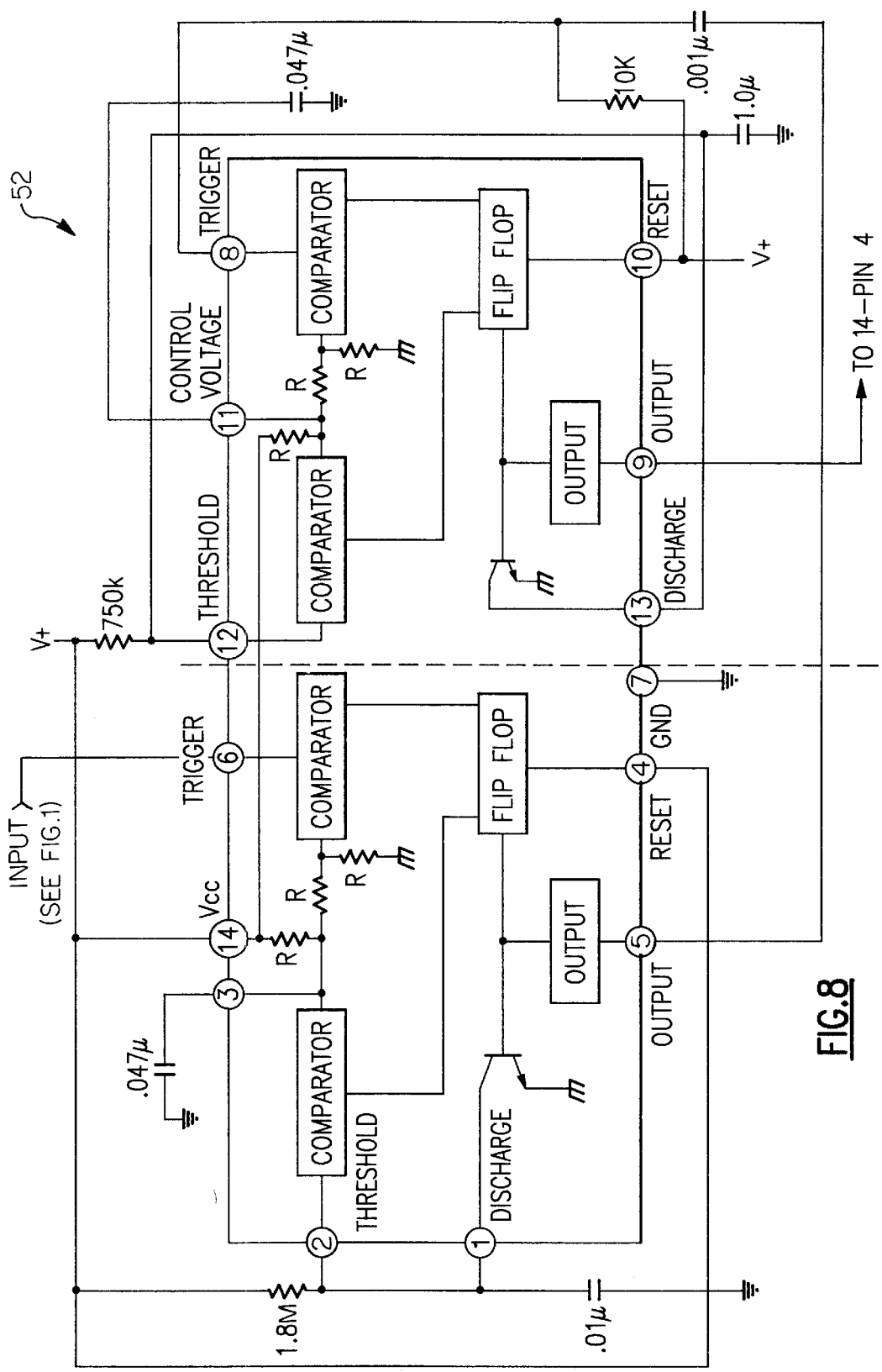
FIG. 8 shows a schematic diagram of an embodiment of a dimmer delay circuit used in the embodiment of FIG. 1.

The output of di/dt detector/amplifier 21 also drives the input, as in waveform T2 in FIG. 3B, to a dimmer delay circuit 52, which preferably uses a dual-timer such as a LM 556 shown in FIG. 8. The first timer in the dual timer is an 18–22 ms delay which acts as a dimmer discriminator initiated by a single di/dt pulse, during which the output of dimmer delay timer 52 is a logic LOW. As the first timer times out, its negative going pulse edge triggers a second timer which is preferably set for 0.75 seconds, i.e., the arc detection window, during which time the output of dimmer delay timer 52 is a logic HIGH. That is, the output of dimmer delay circuit 52 is preferably a pulse as shown at T13 in FIG. 3G that is 0.75 seconds wide with a delay time of 18–22 ms. This delay time prevents any signal due to the initial transient startup of a dimmer switch as illustrated by peak 105 in FIG. 3D from falsely affecting the detector threshold stage in detector/amplifier 22. The threshold level established by detector/amplifier 22 is chosen so that the phase control dimmer does not produce further peaks in the FIG. 2D waveform after about 18–22 ms. Thus, peaks occurring after the 18–22 ms delay time but before expiration of the 0.75 second window are due to arcing events, for example, peak 106 in FIG. 2D. Once the window interval of about 0.75 seconds established by the second timer expires, the device is unresponsive to di/dt pulses from di/dt detector 21, until the first timer times out and edge-triggers the second timer, re-initiating a window interval. In this manner, arc-mimicking noise expected to last for the first timer delay interval is ignored.

Figure 3H:
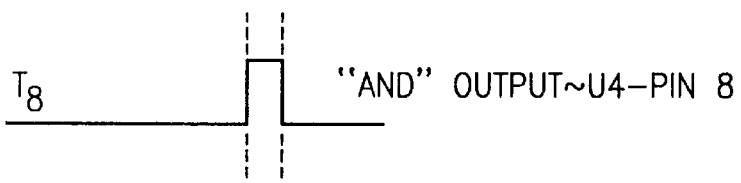
FIG. 3H shows a circuit waveform used in explaining the embodiment of FIG. 1.
Figure 3I:
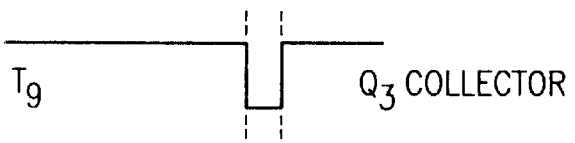
FIG. 3I shows a circuit waveform used in explaining the embodiment of FIG. 1.

The outputs of pulse widening circuits 50, 51 are preferably ANDed by an AND gate 13 so that when signals are present at both inputs of AND gate 13, the output of AND gate 13 goes HIGH as shown as T7 in FIG. 3F, thus signaling the possible presence of an arcing fault. The output of AND gate 13 is fed to a second AND gate 14, where the signal is ANDed with the output of dimmer delay circuit 52. If the output of AND gate 13 is HIGH during the second window, indicating that the HIGH output from AND gate 13 is not caused by a dimmer switch or tungsten bulb burnout event, a logic HIGH output of AND gate 14 is produced. Other logic arrangements that combine NAND gates, NOR gates, OR gates, and inverters can achieve the same result and are considered within the ability of one of ordinary skill in the art. The AND gate 14 output, which is shown as T8 in FIG. 3H, is fed via input circuitry to an SCR driver stage 53, where the waveform is shown in FIG. 3I as T9.

Figure 3J:
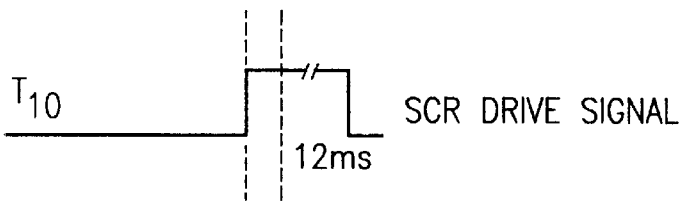
FIG. 3J shows a circuit waveform used in explaining the embodiment of FIG. 1.
Figure 3K:
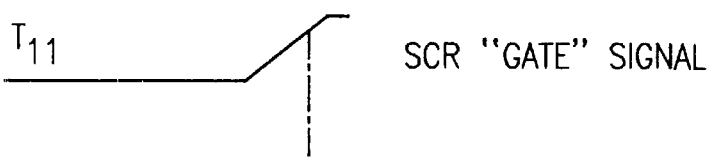
FIG. 3K shows a circuit waveform used in explaining the embodiment of FIG. 1.
Figure 3L:
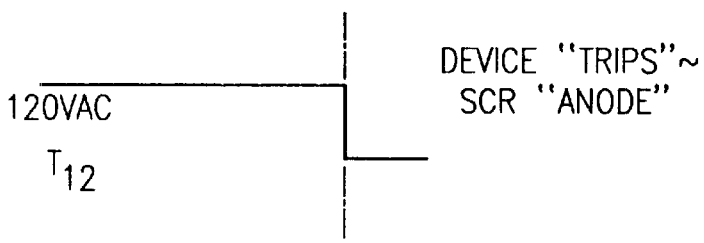
FIG. 3L shows a circuit waveform used in explaining the embodiment of FIG. 1.
Figure 9:
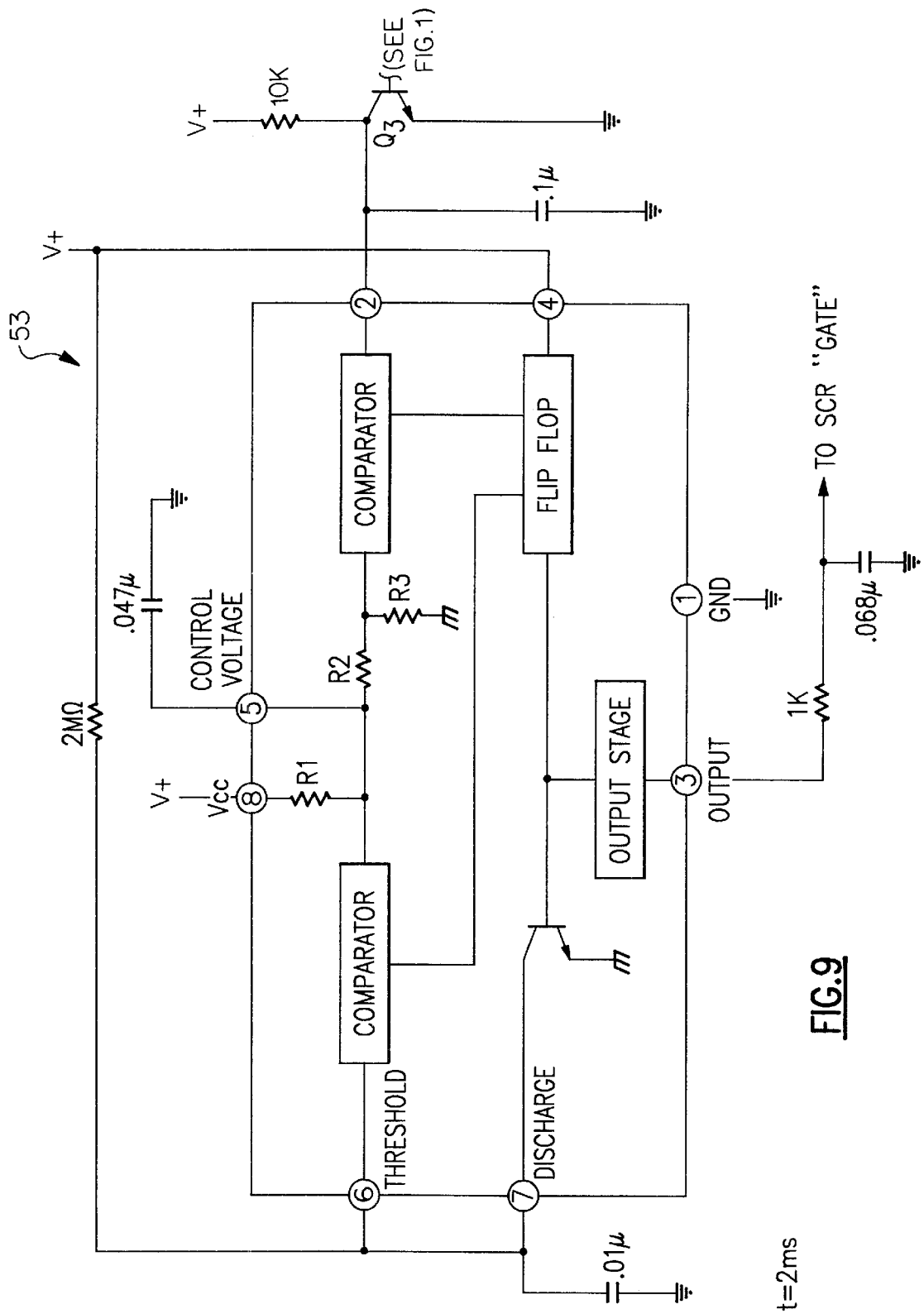
FIG. 9 shows a schematic diagram of an embodiment of an SCR driver circuit used in the embodiment of FIG. 1.

An embodiment of SCR driver stage 53 is shown in FIG. 9 which widens the HIGH logic output signal from AND gate 14 by about 12 ms. The output waveform of SCR driver stage 53 is shown in FIG. 3J as T10. The input to an SCR 54 is shown as T11 in FIG. 3K as a ramped voltage, the slope of the ramp being determined by the values of resistor 56 and capacitor 58 and typically 3 ms. When the ramp voltage reaches a predetermined threshold, SCR 54 turns ON, producing the waveform shown at T12 in FIG. 3L. Circuit interrupter 102 is activated by the connection of breaker solenoid 60 between line conductor 101 and neutral conductor 100 through SCR 54, thus de-energizing the branch circuit and disconnecting load 99 from the line voltage. The purpose of the voltage ramp established by resistor 56 and capacitor 58 is to delay the conduction angle of SCR 54, such that solenoid 60 is connected between line conductor 101 and neutral conductor 100 at the crest of the sinusoidally varying line voltage to maximize the efficiency of circuit interrupter 102.

The purpose of SCR driver 53 is to assure that a trip signal from AND gate 14, producing a logic HIGH output, and capacitor 56 and resistor 58, producing the threshold voltage, continues into the next half of the power line frequency. SCR 54, able to conduct current in only one direction, is thereby assured of turning ON, even if the signal to enable SCR 54 is occurring during the line voltage polarity in which SCR 54 is not conductive. In another embodiment, SCR 54 is replaced by a bi-directional device such as a triac that is able to conduct current through solenoid 60 derived from the line voltage during both polarities of the line voltage, thereby eliminating the need for SCR driver 53.

Figure 10:
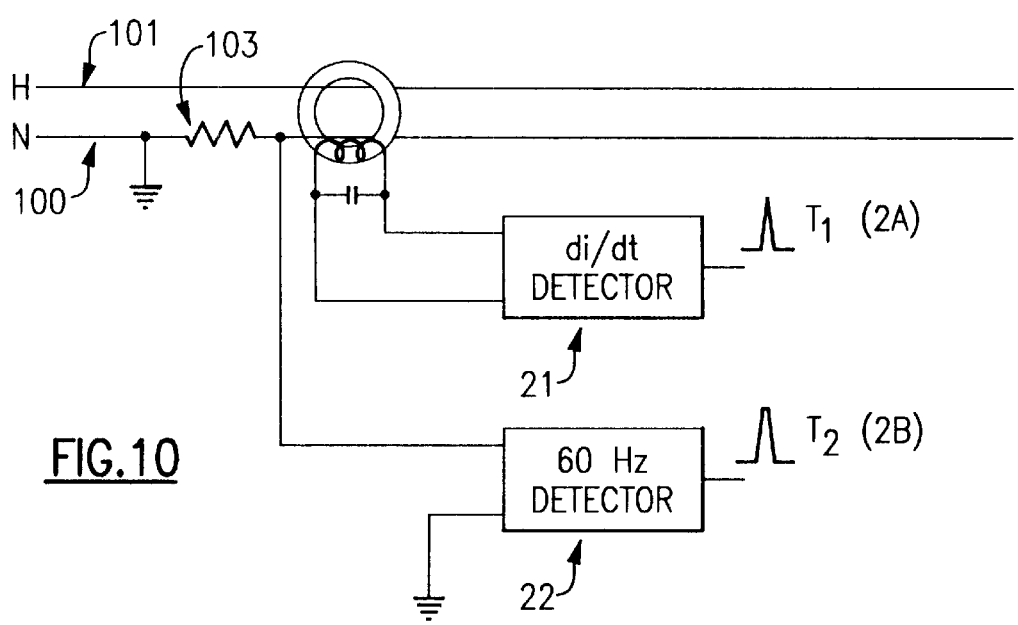
FIG. 10 shows a schematic diagram of a fault detector according to a dual sensor embodiment of the present invention.

Referring to FIG. 10, an alternate embodiment uses the same components as the original embodiment in FIG. 1, but with the addition of a second sensor. The second sensor includes a resistive element 103, typically referred to as a buss bar, connected in series with line conductor 101 or neutral conductor 100. The resistive sensor senses the 60 Hz component of the arcing signature, while the toroidal 20 sensor senses the di/dt component of the arcing signature. The dual sensor approach simplifies toroidal sensor 20 design fabrication as well as eliminating core saturation concerns.

Referring back to FIG. 1, and in an alternative embodiment, dimmer delay timer 53 can be eliminated and the approximate 12 to 18 ms delay previously established by the first timer of dimmer delay timer 53 can be replaced by the same approximate time constant set by resistor 62 and capacitor 64. As a result, 60 Hz noise associated with a dimmer switch or bulb burn-out is not of sufficient duration to produce a pre-determined reduction of voltage across capacitor 64 to trigger pulse widener 51, which is a necessary condition for tripping the interrupting contacts 102 as previously described.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. An arc fault detector for an AC power line, said AC power line including first and second conductors for carrying current to a load, comprising:
   a current sensor coupled to said first and second conductors for generating a signal responsive to asynchronous rate of change and threshold behavior of said current in said conductors;
   first and second detectors receiving said signal from said current sensor as inputs;
   said first detector detecting said rate of change behavior of said current and outputting a first pulse;
   said second detector detecting said threshold characteristics of said current and outputting a second pulse;
   a first pulse widener for widening one of said first and second pulses and not widening the other pulse; and
   a first logic circuit receiving said widened pulse and said unwidened pulse and producing a pulse output indicative of both said widened pulse and said unwidened pulse being present at said first logic circuit simultaneously.

2. A detector according to claim 1, wherein said first and second detectors include first and second low power ground fault interrupter integrated circuits, respectively.

3. A detector according to claim 1, further comprising:
   a dimmer delay circuit receiving said first pulse as input and outputting a pulse having a predetermined delay and pulse width;
   a second logic circuit receiving said output from said first logic circuit and said pulse from said dimmer delay circuit and producing a pulse output indicative of both said pulse output from said first logic circuit and said pulse from said dimmer delay circuit being present at said second logic circuit simultaneously.

4. A detector according to claim 3, further comprising:
   a switch connected to said second logic circuit;
   a tripping mechanism connected to said switch and said first and second conductors; and
   wherein said switch receives said pulse output from said second logic circuit and activates said tripping mechanism which in turn interrupts said current to said load.

5. A detector according to claim 3, wherein said signal from said second logic circuit is held for an SCR delay period.

6. A detector according to claim 3, wherein said dimmer delay circuit includes at least one one-shot timer.

7. A detector according to claim 3, wherein said dimmer delay circuit includes an RC delay circuit.

8. A detector according to claim 1, further comprising:
   a switch connected to said first logic circuit;
   a tripping mechanism connected to said switch and said first and second conductors; and
   wherein said switch receives said pulse output from said first logic circuit and activates said tripping mechanism which in turn interrupts said current to said load.

9. A detector according to claim 1, further comprising:
   a second pulse widener for widening said unwidened pulse, wherein said first logic circuit receives both widened pulses and produces an output indicative of both widened pulses being present at said logic circuit simultaneously.

10. A detector according to claim 9, wherein said first and second pulse wideners include first and second one-shot timers, respectively.

11. A detector according to claim 9, wherein said first and second detectors include first and second low power ground fault interrupter integrated circuits, respectively.

12. A detector according to claim 9, further comprising:
a dimmer delay circuit receiving said first pulse as input and outputting a pulse having a predetermined delay and pulse width;
a second logic circuit receiving said output from said first logic circuit and said pulse from said dimmer delay circuit and producing a pulse output indicative of both said pulse output from said first logic circuit and said pulse from said dimmer delay circuit being present at said second logic circuit simultaneously.

13. A detector according to claim 12, further comprising:
a switch connected to said second logic circuit;
a tripping mechanism connected to said switch and said first and second conductors; and
wherein said switch receives said pulse output from said second logic circuit and activates said tripping mechanism which in turn interrupts said current to said load.

14. A detector according to claim 12, wherein said signal from said second logic circuit is held for an SCR delay period.

15. An arc fault detector for an AC power line, said AC power line including first and second conductors for carrying current to a load, comprising:
a current sensor coupled to said first and second conductors for generating a signal responsive to rate of change behavior of said current in said conductor;
a resistive element in series with said second conductor;
a first detector receiving said signal from said current sensor as input;
a second detector receiving a signal from a load side of said resistive element as input;
said first detector detecting said rate of change behavior of said current and outputting a first pulse;
said second detector detecting a threshold characteristic of said current and outputting a second pulse;
a first pulse widener for widening one of said first and second pulses and not widening the other pulse; and
a first logic circuit receiving said widened pulse and producing a pulse output indicative of both said widened pulse and said unwidened pulse being present at said first logic circuit simultaneously.

16. A detector according to claim 15, wherein said first and second detectors include first and second low power ground fault interrupter integrated circuits, respectively.

17. A detector according to claim 15, further comprising:
a dimmer delay circuit receiving said first pulse as input and outputting a pulse having a predetermined delay and pulse width;
a second logic circuit receiving said output from said first logic circuit and said pulse from said dimmer delay circuit and producing a pulse output indicative of both said pulse output from said first logic circuit and said pulse from said dimmer delay circuit being present at said second logic circuit simultaneously.

18. A detector according to claim 17, further comprising:
a switch connected to said second logic circuit;
a tripping mechanism connected to said switch and said first and second conductors; and
wherein said switch receives said pulse output from said second logic circuit and activates said tripping mechanism which in turn interrupts said current to said load.

19. A detector according to claim 17, wherein said signal from said second logic circuit is held for an SCR delay period.

20. A detector according to claim 17, wherein said dimmer delay circuit includes at least one one-shot timer.

21. A detector according to claim 17, wherein said dimmer delay circuit includes an RC delay circuit.

22. A detector according to claim 15, further comprising:
a switch connected to said first logic circuit;
a tripping mechanism connected to said switch and said first and second conductors; and
wherein said switch receives said pulse output from said first logic circuit and activates said tripping mechanism which in turn interrupts said current to said load.

23. A detector according to claim 15, further comprising:
a second pulse widener for widening said unwidened pulse, wherein said first logic circuit receives both widened pulses and produces an output indicative of both widened pulses being present at said logic circuit simultaneously.

24. A detector according to claim 23, wherein said first and second pulse wideners include first and second one-shot timers, respectively.

25. A detector according to claim 23, wherein said first and second detectors include first and second low power ground fault interrupter integrated circuits, respectively.

26. A detector according to claim 23, further comprising:
a dimmer delay circuit receiving said first pulse as input and outputting a pulse having a predetermined delay and pulse width;
a second logic circuit receiving said output from said first logic circuit and said pulse from said dimmer delay circuit and producing a pulse output indicative of both said pulse output from said first logic circuit and said pulse from said dimmer delay circuit being present at said second logic circuit simultaneously.

27. A detector according to claim 26, further comprising:
a switch connected to said second logic circuit;
a tripping mechanism connected to said switch and said first and second conductors; and
wherein said switch receives said pulse output from said second logic circuit and activates said tripping mechanism which in turn interrupts said current to said load.

28. A detector according to claim 26, wherein said signal from said second logic circuit is held for an SCR delay period.

29. An arc fault detector for an AC power line, said AC power line including first and second conductors for carrying current to a load, comprising:
means, coupled to said first and second conductors, for generating a signal responsive to asynchronous rate of change and threshold behavior of said current in said conductors;
means for detecting said rate of change behavior of said current and outputting a first pulse;
means for detecting said threshold characteristics of said current and outputting a second pulse;
means for widening one of said first and second pulses and not widening the other pulse; and
first logic means for receiving said widened pulse and said unwidened pulse and producing a pulse output indicative of both said widened pulse and said unwidened pulse being present at said first logic means simultaneously.

30. A detector according to claim 29, further comprising:

delay means for receiving said first pulse as input and outputting a pulse having a predetermined delay and pulse width;

second logic means for receiving said output from said first logic means and said pulse from said delay means and producing a pulse output indicative of both said pulse output from said first logic means and said pulse from said delay means being present at said second logic means simultaneously.

31. A method for detecting an arc fault in an AC power line, said AC power line including first and second conductors for carrying current to a load, comprising the steps of:

generating a signal responsive to asynchronous rate of change and threshold behavior of said current in said conductors;

detecting said rate of change behavior of said current and outputting a first pulse;

detecting said threshold characteristics of said current and outputting a second pulse;

creating a third pulse having a predetermined delay and pulse width, wherein said predetermined delay starts coincident with a rising edge of said first pulse;

producing a fourth pulse indicative of both said first and second pulses being present at a first logic point simultaneously; and producing a fifth pulse indicative of both said third and fourth pulses being present at a second logic point simultaneously.

32. A method according to claim 31, further comprising the step of interrupting, in response to said fifth pulse, said current to said load.

33. A method for detecting an arc fault in an AC electrical distribution system, comprising the steps of:

detecting a sharply rising edge in current flowing through a portion of said AC electrical distribution system;

detecting an increase in magnitude of said current above a predetermined threshold level; and establishing that said sharply rising edge in said current and said increase in magnitude of said current are not caused by an inrush current from a device.

34. A method for detecting an arc fault in an electrical distribution system, comprising the steps of:

monitoring a load current and a first derivative of said current carried by said electrical distribution system;

creating first and second signals from said step of monitoring;

independently comparing magnitudes of said first and second signals against pre-established thresholds;

creating first and second asynchronous pulses from said step of comparing magnitudes;

elongating one of said first and second asynchronous pulses by a first pre-determined duration, thereby producing one elongated pulse and one non-elongated pulse;

opening electrical contacts in said electrical distribution system if said elongated pulse and said non-elongated pulse overlap; and interrupting a flow of electrical current through said electrical distribution system upon an overlapping occurrence.

35. A method according to claim 34, further comprising the steps of:

elongating said non-elongated pulse;

opening electrical contacts in said electrical distribution system if said elongated pulses overlap; and interrupting a flow of electrical current through said electrical distribution system upon an overlapping occurrence.

36. A method for detecting an arc fault in an electrical distribution system, wherein said electrical distribution system includes a plurality of conductors, comprising the steps of:

monitoring a load current and a first time derivative of current carried by said conductors;

creating first and second signals from said step of monitoring;

independently comparing magnitudes of said first and second signals against pre-established thresholds;

creating first and second asynchronous pulses from said step of comparing magnitudes;

initiating a pre-determined time interval when said first signal first exceeds said threshold;

elongating said first and second asynchronous pulses by first and second pre-determined durations; and opening electrical contacts in said electrical distribution system if said elongated pulses overlap and only after said pre-determined time interval has elapsed.

37. A method for detecting an arc fault in an electrical distribution system, wherein said electrical distribution system includes a plurality of conductors, comprising the steps of:

discriminating between arcing faults and phase control dimmer signals;

producing a pulse elongated by a pre-determined time whenever a magnitude of a time first derivative of a current carried on said electrical conductors exceeds a threshold;

initiating a pre-determined time interval when a first of a plurality of said pulses are detected;

generating a trigger signal that triggers a set of load current contacts to open when said a predetermined number of said plurality of pulses are detected;

disabling said trigger signal when said current is below a threshold; and disabling said trigger signal during said pre-determined time interval.

* * * * *